US 6,814,499 B2

(12) United States Patent
Finona (10) Patent No.: US 6,814,499 B2
(45) Date of Patent: Nov. 9, 2004

(54) OPTICAL FIBER CONNECTOR LATCHING MECHANISM

(75) Inventor: Michael Santos Finona, Lake Forest, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/294,515

(22) Filed: Nov. 13, 2002

(65) Prior Publication Data

US 2004/0091214 A1 May 13, 2004

(51) Int. Cl.[7] .................................................. G02B 6/36
(52) U.S. Cl. ........................................ 385/76; 385/77
(58) Field of Search ............................... 385/76, 78, 60

(56) References Cited

U.S. PATENT DOCUMENTS

| | | | | |
|---|---|---|---|---|
| 4,174,882 A | | 11/1979 | McCartney | 350/96.21 |
| 4,787,706 A | | 11/1988 | Cannon, Jr. et al. | 350/96.2 |
| 5,016,968 A | * | 5/1991 | Hammond et al. | 385/78 |
| 5,381,501 A | | 1/1995 | Cardinal et al. | 385/54 |
| 5,553,180 A | | 9/1996 | Belenkiy et al. | 385/59 |
| 5,613,025 A | | 3/1997 | Grois et al. | 385/53 |
| 5,619,604 A | | 4/1997 | Shiflett et al. | 385/59 |
| 5,692,080 A | | 11/1997 | Lu | 385/60 |
| 5,719,977 A | * | 2/1998 | Lampert et al. | 385/60 |
| 5,940,561 A | | 8/1999 | Dean, Jr. et al. | 385/60 |
| 5,971,625 A | | 10/1999 | Lu | 385/60 |
| 6,069,992 A | | 5/2000 | Hyzin | 385/55 |
| 6,149,313 A | | 11/2000 | Giebel et al. | 385/59 |
| 6,238,235 B1 | * | 5/2001 | Shavit et al. | 439/418 |

* cited by examiner

Primary Examiner—Chandrika Prasad
(74) Attorney, Agent, or Firm—Roger C. Turner

(57) ABSTRACT

An optical fiber connector (20) is provided with a compact latching mechanism (42) for holding the connector in a bulkhead casing (12) when inserted therein, and for enabling easy removal, the connector also having a simplified strain relief assembly (170) for fiber optic cables. The connector has an outer shell with slits (74, 74) that form a beam (60) having a rear end (70) merging with the rest of the shell, a free front end (82), and a beam middle (84) that forms a latch dog (32) with a rearwardly-facing shoulder. When the connector is inserted into the bulkhead casing, the latch dogs snap into latch-receiving slots (30) of the casing to latch the connector in place. When the middle of the beam is depressed into a groove (100), the latch dog moves inwardly and out of engagement with the bulkhead shoulder. A latch release member (62) has a rear end (112) mounted on the outer shell and a front end (114) that can depress a bump (116) on the beam middle portion to facilitate inward deflection of the beam. A strain relief member (172) with grooves that receive the fiber optic cables, can slide along an alignment pin (174) until the strain relief member is stopped by a rear end portion (190) of the outer shell.

11 Claims, 6 Drawing Sheets

OPTICAL FIBER CONNECTOR LATCHING MECHANISM

BACKGROUND OF THE INVENTION

One type of optical fiber connector system includes a standard bulkhead shell or casing that is designed to receive an optical fiber cable plug having a width of 11.7 mm and a height of 9 mm. The bulkhead casing is commonly mounted on a panel, and two of such standard plugs can be inserted into opposite ends of a casing cavity to connect optical fibers of the connectors. Each end of the bulkhead casing has a pair of latch-receiving slots that receive latches of a connector to hold the connector to the casing until it is purposely removed. At present, a latching mechanism is available that automatically releases a latch when a sleeve lying around the connector is pulled rearwardly, but that mechanism is covered by a patent so competitors of the patent owner cannot use it.

Applicant set out to design a different latching mechanism that enabled a connector to be inserted into the same standard bulkhead casing and to be latched therein, until the connector was purposely removed. During applicant's design of a different connector, applicant found that it could design a connector that held four optical fiber termini within the same constraints of a width of 11.7 mm and a height of 9 mm, and applicant designed a latch mechanism of low profile that could still fit into the bulkhead casing to latch therein and which enabled easy removal. A challenge in the design was to make the latch mechanism of very low profile. Also, since four termini could be mounted in the small space of applicant's improved connector, applicant required strain relief for all fiber optic cables trailing from the termini.

SUMMARY OF THE INVENTION

In accordance with one embodiment of the present invention, an optical fiber connector is provided, which can be inserted and latched in a standard bulkhead casing that receives a connector having a width of 11.7 mm and height of 9 mm, and which has latches that engage casing shoulders, which uses a new latching mechanism, and which can hold a plurality of optical fiber termini and provides strain relief to the corresponding plurality of optical fiber cables. The connector includes an outer shell that fits closely in the standard bulkhead casing, and a terminus receiver that lies in the outer shell and that has terminus-receiving passages that receive termini with optical fiber cables extending rearwardly therefrom. The outer shell has a main part with a shell slot that receives a latching beam. The latching beam is preferably formed integrally with the rest of the outer shell, so a rear end of the beam is integral with the rest of the shell. The beam has a free front end and has a middle forming a latch dog with a rearwardly-facing shoulder that can engage a forwardly-facing shoulder on the bulkhead casing to latch the connector in the casing. The beam middle portion can be deflected inwardly toward the axis of the connector to deflect the latch dog out of line with the bulkhead casing shoulder, so the connector can be pulled out of the casing. The terminus receiver that holds the optical termini, has a groove that enables inward deflection of the beam middle portion.

A latch release member has a rear end mounted on the outer shell and has a front portion that lies over the middle of the beam, to facilitate depression of the beam. A bump on the middle portion of the beam receives a recess on the latch release member, to enable simple mounting of the rear end of the release member while enabling the bump to position the latch release member. The front end of the beam is supported against inward deflection to stiffen the beam against accidental inward deflection.

The plurality of optical fiber cables are provided with strain relief by providing a strain relief member with slots that each receive one of the cables, and with a shrink wrap fixing each cable to the strain relief member. An alignment pin has front end fixed to the terminus receiver and a rear end. The strain relief member can slide along the pin until stopped by the rear of the outer shell.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2:
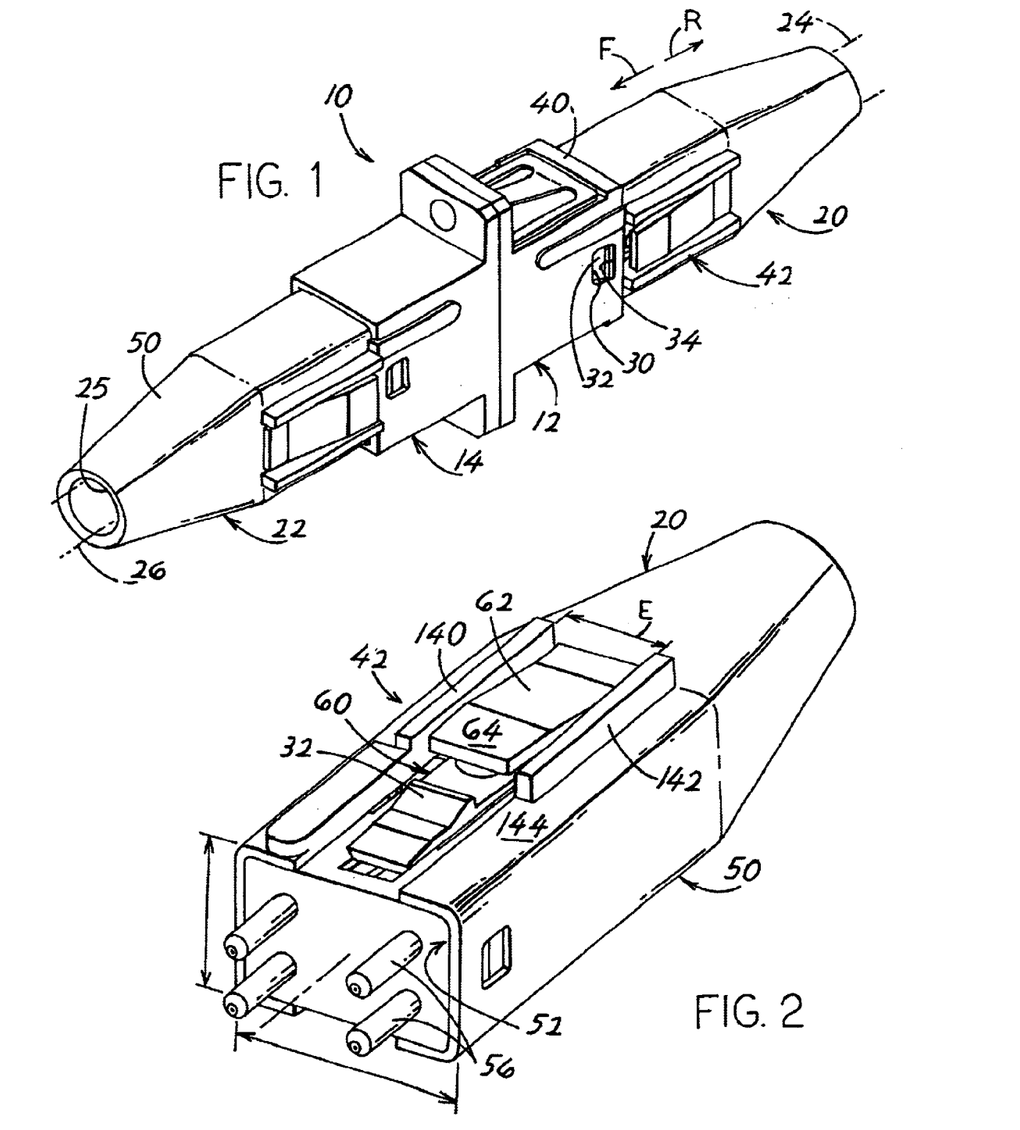
FIG. 1 is an isometric view of a connector system, showing a pair of bulkhead casings and a pair of optical fiber connectors inserted in the casings to connect termini of the two connectors.
FIG. 2 is an isometric view of one of the cable plug connectors of the system of FIG. 1, in its fully assembled configuration, but without the optical cables.

FIG. 1 illustrates a connector system 10 which includes a pair of bulkhead shells or casings 12,14 and a pair of cable plug connectors 20, 22 that can be inserted into the casings. In most cases, the casings 12, 14 are mounted on a fixed panel. Each connector 20, 22 carries one or more optical fiber termini that are connected to the front ends of fiber optic cables 24, 26.

There are a large number of casings in present use, of the construction shown at 12 and 14, which are of a predetermined standard construction to receive a connector such as 20 of predetermined size. Also, each casing has a pair of latch-receiving slots 30 that each receives a latch dog 32. A forwardly-facing shoulder 34 of the slot 30 can engage a rearwardly-facing shoulder on the latch dog to hold the cable securely in place. However, the connector can be easily removed by operating a mechanism in a natural way that releases the latch dog 32 from the walls of the slot 30 while pulling out the connector. Applicant constructs the connector 20 to fit in the rearwardly R facing cavity 40 of a standard casing 12, and to provide a latch dog 32 that will automatically latch the connector in place, and with a mechanism 42 that enables easy unlatching during pullout of the connector.

FIG. 2 shows that the connector 20 includes an outer shell 50, a terminus receiver 52, and four optical fiber termini 56. The latch mechanism 42 includes a latch beam 60 that forms the latch dog 32, and a latch release member 62 with a pressing surface 64 that is depressed to release the connector from the bulkhead casing while pulling out the connector. Two substantially identical latch mechanisms are provided, one at the top and the other at the bottom of the outer shell.

Figure 3:
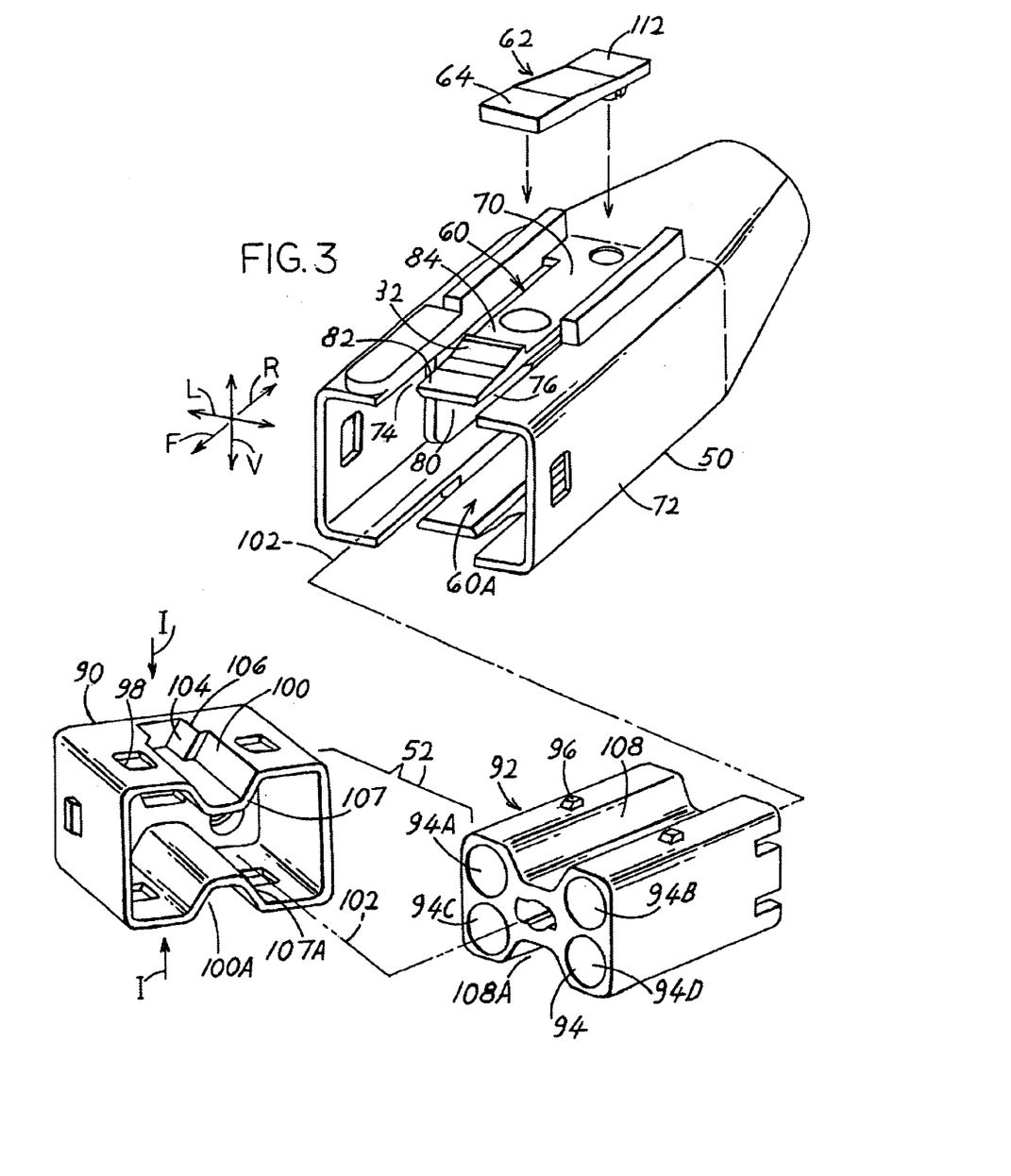
FIG. 3 is an exploded isometric view of the connector of FIG. 2.

FIG. 3 shows that the beam 60 has a beam rear end 70 that merges with the rest of the outer shell; that is, the beam rear end merges with a shell main part 72. This is accomplished by forming a pair of slits 74, 76 in the outer shell to leave a slot 80 that is occupied by the latch beam. The beam has a free front end 82 and has a beam middle 84 between the front end 82 and the rear end 70. When the pressing surface 64 of the latch relief member 62 is depressed, it depresses the beam middle 84, and thereby depresses the latch dog 32 to release the connector from the bulkhead casing. An identical beam 60A and corresponding beam latch relief member is provided at the opposite side or bottom of the outer shell 50, which is shown spaced vertically V from the top of the shell.

The terminus receiver 52 includes molded plastic front and rear blocks 90, 92. The rear block 92 has termini-receiving passages 94 that receive optical termini. The front block 90 closely receives the rear block 92, with detents 96 of the rear block received in openings 92 of the front block.

The front block 90 has a latch-receiving groove 100. The groove portion under the beam middle is wide enough to receive the beam middle 84 when the beam middle is depressed downwardly, or inwardly, towards the axis 102 of the plug connector. However, the groove has a narrowed front end 104 that forms front wall parts 106 that support the free front end 82 of the beam against inward I deflection toward the axis 102 while allowing the free front end 82 to slide slightly as the beam middle 84 deflects into the rest of the groove 100. The front block has inward projections 107, 107A corresponding to the grooves 100, 100A and the rear block has groove parts 108,108A that receive the inward projections.

Figures 4, 5, 6, 6A, 6B:
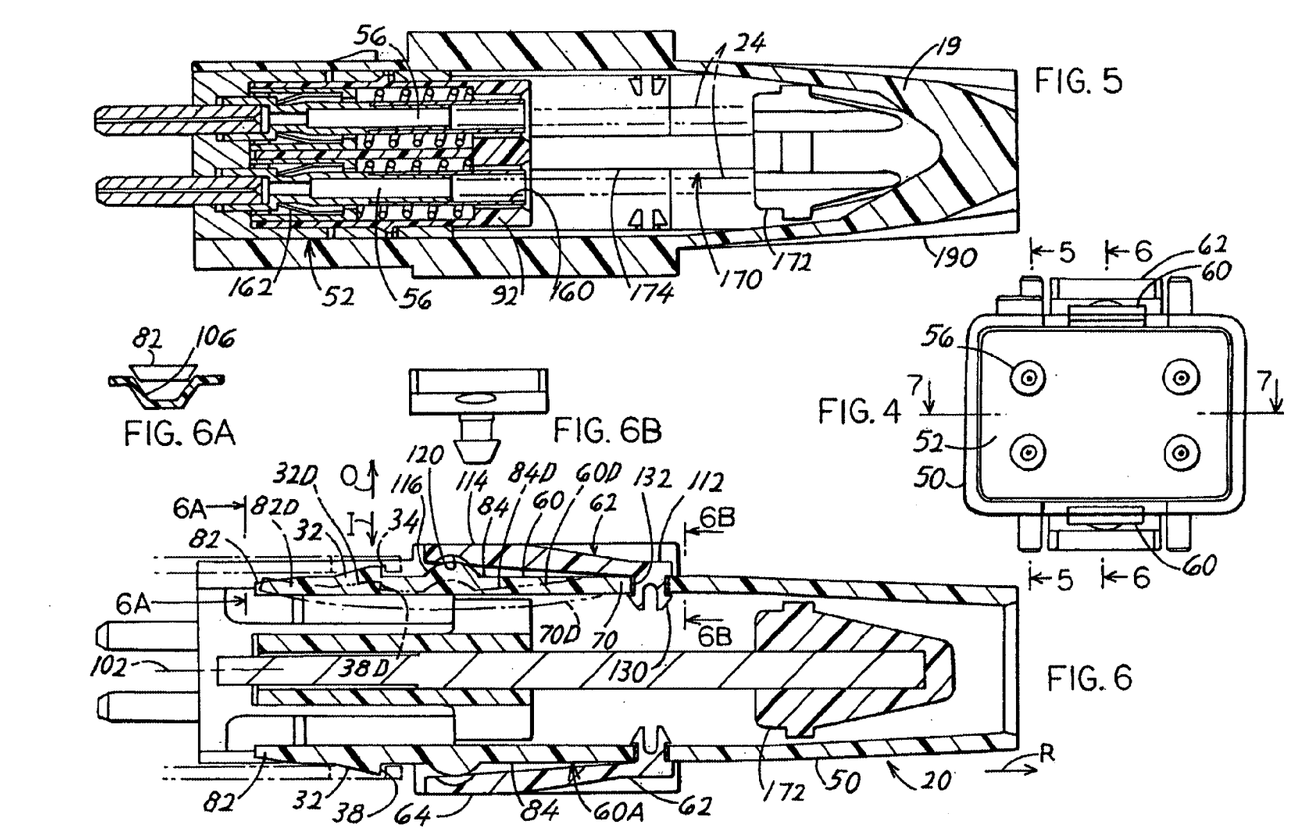
FIG. 4 is a front elevation view of the connector of FIG. 2.
FIG. 5 is a sectional view taken on line 5—5 of FIG. 4.
FIG. 6 is a sectional view taken on line 6—6 of FIG. 4.
FIG. 6A is a sectional view taken on line 6A, 6A of FIG. 6.
FIG. 6B is a rear elevation view taken on line 6B, 6B of FIG. 6, showing a latch release member.

FIG. 6 shows the beams 60 and 60A in their quiescent position, wherein the beam middles 84 are not inwardly I deflected, so rearwardly-facing shoulders 38 on the latch dogs 32 engage the forwardly-facing shoulders 34 on the casing. As described above, the free front end 82 of each latch beam is supported against inward deflection. FIG. 6A shows the manner in which the beam front end 82 is supported on walls 106 at the front of the terminus retainer.

FIG. 6 shows that when the beam middle 84 is pressed inwardly I toward the connector axis 102, the beam deflects to the deflected orientation 60D wherein the beam rear end at 70D and front end at 82D are both supported against inward deflection but can bend, while the beam middle has deflected inwardly to the position 84D. Such deflection results in the latch dog deflecting to the position 32D wherein its shoulder at 38D is out of line with the bulkhead shoulder 34. That is, the latch dog shoulder at 38D does not lie directly forward of the bulkhead casing shoulder 34, so the plug connector 20 can be pulled rearwardly R out of the casing.

It would be possible to have a person directly depress the beam middles 84 of the two beams together and pull out the connector from the bulkhead casing. However, even when the latch beams 60, 60A are not deflected inwardly, they lie substantially flush with the rest of the top and bottom walls of the outer shell. Each beam has a small width W (FIG. 3) of about 2 to 3 mm, so it can be difficult for a person to fully deflect the beam middles into the grooves while pulling out the connector. To facilitate such deflection, applicant provides the latch release members 62 at the top and bottom of the connector. Each latch release member 62 (FIG. 6) has a rear end 112 that is fastened to the outer shell 50, and has a front portion 114 that lies immediately outward O of the beam middle. The beam middle is provided with a bump 116, and the release member front portion 114 is provided with a recess 120 that receives at least the top or outer end of the bump. This allows the bump 116 to keep the latch release member orientated so its front portion lies over the bump, without requiring the latch release member rear end 112 to be fixed against rotation. Instead, the rear end 112 is mounted in place by projecting a fastener 130 through a hole 132 in the shell at a location immediately rearward of the beam. The fastener 130 includes one or more legs with projections at the inner end that keep the rear end fastened in place, although not fixed against rotation. The latch release member 62 is preferably resiliently deflectable, although it could rock on the fastener 130 if the fastener lay loose in the hole. The front portions 114 of the latch release members provide outwardly-projecting pressing surfaces 64 that can be readily deflected inwardly and pulled rearwardly to remove the plug connector.

As shown in FIG. 2, applicant provides a pair of rails 140, 142 that project outwardly from a flat surface 144 of the outer shell. The rails protect the latch release member 62 from harm. The rails are laterally spaced a distance E such as 5 mm, and the pressing surface 64 of the latch release member is substantially flush with the upper ends of the rails. As a result, a person can readily depress the latch members 62, and can apply further squeezing force to the rails to firmly grasp the connector to pull it out of the bulkhead casing.

Figure 8:
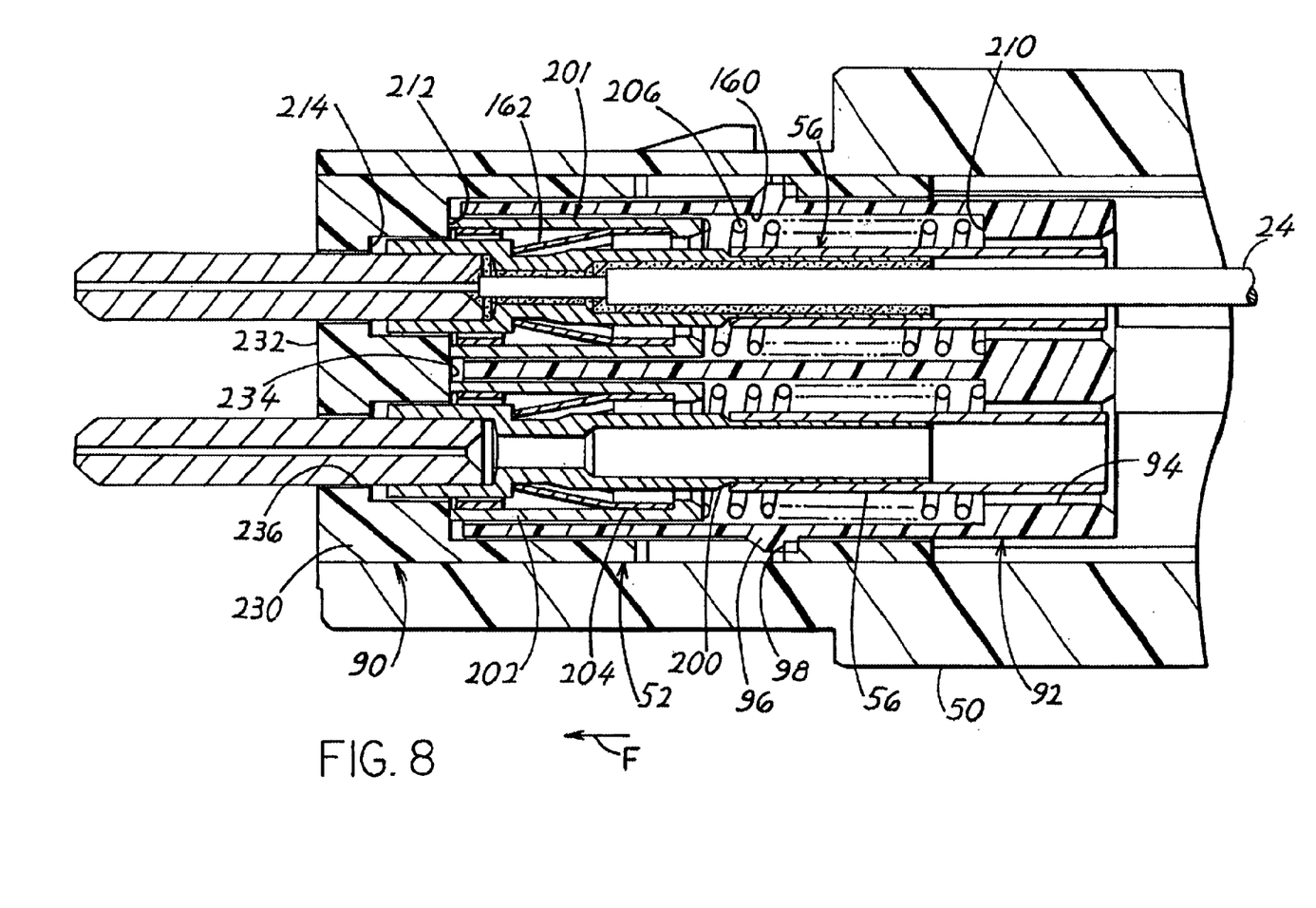
FIG. 8 is an enlarged view of a front portion of the connector of FIG. 5.
Figure 9:
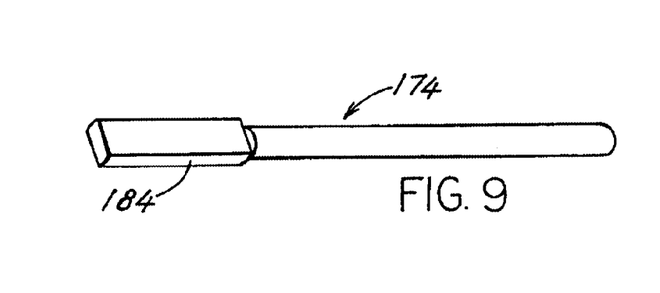
FIG. 9 is an isometric view of the alignment pin of FIG. 7.
Figure 10:
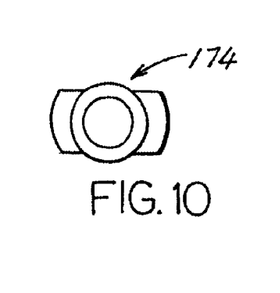
FIG. 10 is a rear elevation view of the alignment pin of FIG. 8.

FIG. 8 shows that the rear block 92 of the terminus receiver 52 has passages 160 that hold most of the body 200 of each terminus. A cable 24 extends from each terminus and through a hole 25 (FIG. 1) in the outer shell of the corresponding connector. Each passage also includes a retention device 201 that includes a sleeve 202 that holds a retention clip 204 biased forwardly by a spring 206. The clip has tines 162 that bias the terminus 56 forwardly. A forwardly-facing shoulder 210 abuts the rear of the spring. A selected terminus can be removed by using a tool to expand the tines 162, while pulling the terminus rearwardly out of the connector.

About the only forwardly-facing shoulder required on the terminus receiver 52 is spring-engaging shoulder 210. However, at least two rearwardly-facing shoulders are required. These include shoulder 212 for limiting forward movement of the retention sleeve 202. Also, shoulder 214 is required to limit forward movement of the terminus. The front block 90 forms these two shoulders 212, 214. The front block 90 is slid rearwardly around the rear block after the termini are installed, until rear block detents 96 snap into front block openings 98.

FIG. 8 shows that the rearwardly-facing shoulders 214, 212 are formed in a thick front plate 230 that has parallel front and rear faces 232, 234 and bores 236 extending between the faces of the front block 90. FIG. 3 shows that the four passages 94 in the rear block can be simple cylinders along their front halves. This facilitates placing them close together to place a plurality of termini in a connector that fits into a space that previously received a connector with only one terminus. The four passages are arranged with an upper pair 94A, 94B on either side of an upper groove part 108, and a lower pair 94C, 94D on either side of a lower groove part 108A.

Figure 11:
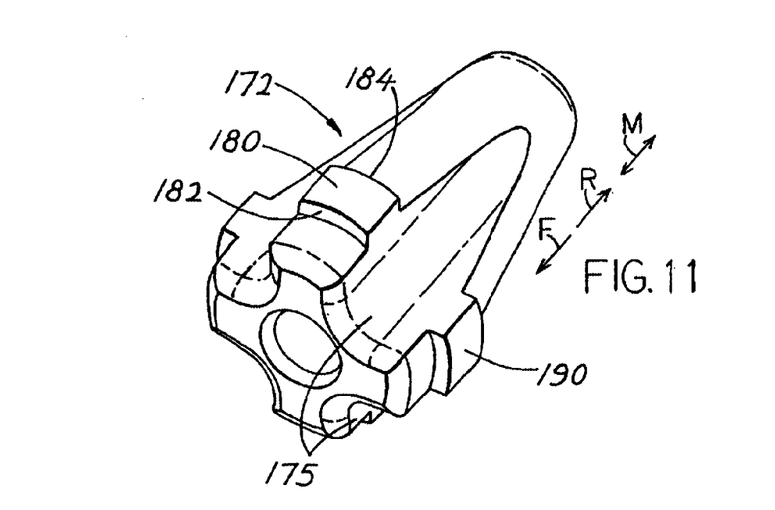
FIG. 11 is an isometric view of the strain relief member of FIG. 7.
Figure 12:
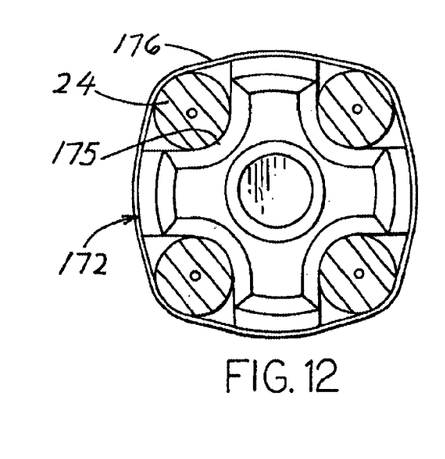
FIG. 12 is a front elevation view of a strain relief assembly which includes the strain relief member of FIG. 11, four optical cables, and a wrap that holds the optical cables to the strain relief member.
Figure 13:
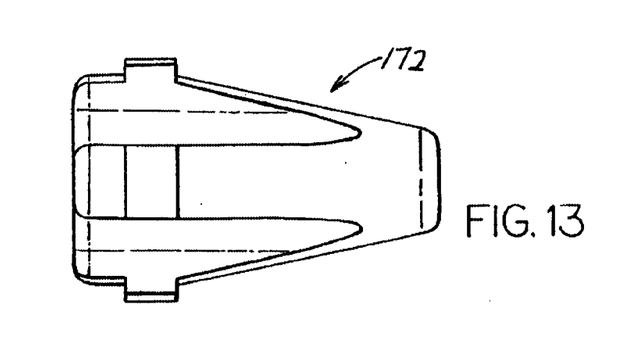
FIG. 13 is a side elevation view of the strain relief member of FIG. 11.

As mentioned above, each terminus is held against rearward movement by tines 162 (FIG. 8) of a retention clip. The retention clip is formed from thin sheet metal, and if a rearward force applied to the cable had to be withstood by the tines 162, then a moderate force could collapse the tines and damage the connector. To avoid damage to the connector, applicant provides a strain relief assembly 170, shown in FIG. 5, which includes a strain relief member 172 and an alignment pin 174. As shown in FIG. 11, the strain relief member 172 has four grooves 175 extending in longitudinal M directions, which are parallel to the front F and rear R directions. Each of the cables 24 is nested in one of the grooves. As shown in FIG. 12, after each of the cables 24 is positioned in one of the grooves 175, a wrap member 176 is placed around the cables and strain relief member and tightened around them. Applicant prefers to use a shrink wrap, which is a tube that shrinks when heated. The wrap 176 firmly holds the cables to the strain relief member. As shown in FIG. 11, the strain relief member has an interrupted flange 180 which is interrupted by the grooves 175, and that forms forwardly and rearwardly facing shoulders 182,184. The shrink wrap engages the shoulders to better prevent the shrink wrap from sliding along the strain relief member.

Figure 7:
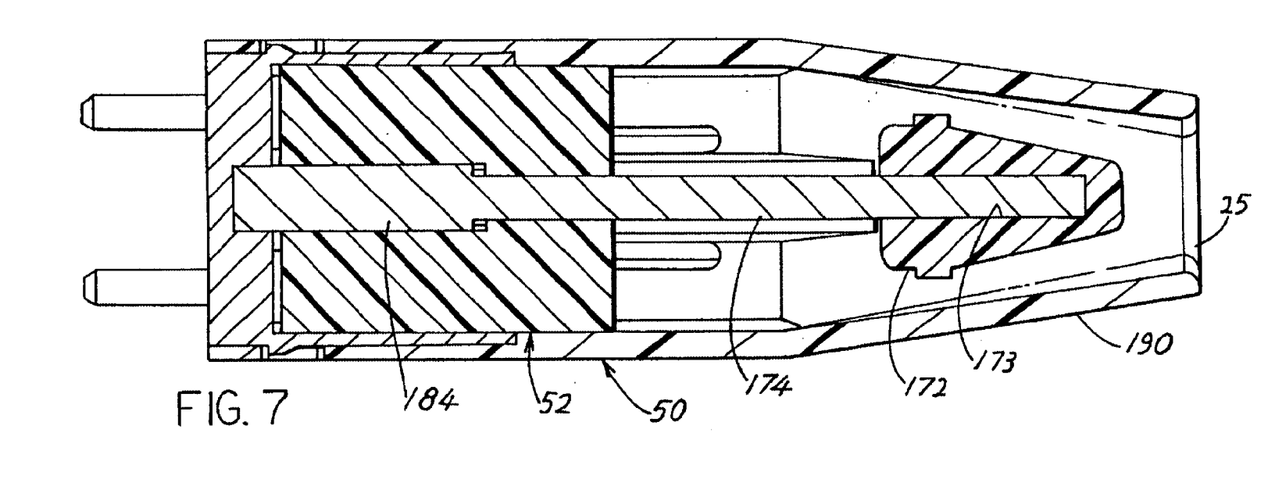
FIG. 7 is a sectional view taken on line 7—7 of FIG. 4.

As shown in FIG. 7, the strain relief member 172 has a bore 173 that slideably receives the rear end of the alignment pin 174. The front end 184 of the pin is fixed to the terminal receiver 52. As a result, rearward forces applied to the cables and transmitted to the strain relief member 172, slide the member 172 rearwardly. As shown in FIG. 5, the strain relief member 172 slides rearwardly until it is stopped by the rear portion 190 of the outer shell 50. The alignment pin 174 prevents cocking of the strain relief member. This arrangement transfers rearward pulling forces on the cables to the outer shell, through only the strain relief member rather than the terminus assembly.

Thus, the invention provides an optical fiber connector, especially one that can fit in a standard bulkhead casing and which has a latch mechanism that allows it to be latched to the standard bulkhead casing and easily released therefrom during pullout. The latch mechanism includes a pair of latch beams, each formed by a pair of slits in the outer shell of the connector, and each beam having a rear end merging with the rest of the outer shell. The beam has a free front end, and a beam middle that forms a latch dog that engages a shoulder of the bulkhead casing. A terminus retainer lying within the shell has top and bottom grooves that each receives a beam middle when the beam middle is depressed into the groove. Despite the grooves, the connector is formed to hold four optical fiber termini instead of a single terminus that was held in prior standard connectors of this type. The terminus-holding passages are arranged with an upper pair on either side of the top groove and a lower pair on either side of the bottom groove. The terminus receiver is formed by a rear block that fits in a front bock, the front block forming forwardly-facing shoulders that engage a sliding retention device and that engage a terminus. Strain relief for the four optical fiber cables is provided by a strain relief member and a wrap such as a shrink wrap that fixes the cables in the grooves of the member. The strain relief member can slide along the rear end of an alignment pin whose front end is fixed to the terminus receiver, until the strain relief member is stopped by a narrowed rear end of the outer shell.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector that can be inserted in a forward longitudinal direction into a bulkhead casing that has a pair of latch-receiving slots forming largely forwardly-facing bulkhead shoulder and be latched thereto, and which can be unlatched from said bulkhead shell and pulled rearwardly therefrom, wherein the connector includes an outer shell and a terminus receiver that lies in said outer shell and that has at least one terminus-receiving passage and at least one optical fiber terminus lying in said passage, wherein:

said outer shell has an axis and has a top and bottom on opposite sides of said axis, said outer shell having a shell main part with a pair of longitudinally-extending shell slots at said opposite sides and said outer shell having a pair of beams each lying in one of said shell slots, each of said beams having a beam rear end merging with said shell main part, a free beam front end, and a beam middle;

said terminus receiver has a pair of grooves that each lies inward of a corresponding one of said beam middles, and therefore each groove lies closer to said axis than the corresponding beam middle;

each of said beam middles has a latch dog with a largely rearwardly-facing latch dog shoulder for engaging one of said bulkhead shoulders, each said beam middle being deflectable inwardly into one of said grooves to move the corresponding latch dog shoulder inward so it lies out of line with the corresponding bulkhead shoulder;

said terminus receiver has supporting walls at the front ends of said grooves, that slideably support said beam front ends against inward deflection when they slide rearward as said beam middles deflect into said grooves.

2. The connector described in claim 1 wherein said beams each has a beam width of no more than about 3 mm, and including:

a pair of latch release members that each has a rear end mounted on said outer shell and a front end that is wider than said beam width and that lies outward and adjacent to a location on the beam middle that lies rearward of said latch dog shoulder, at one of said beams;

each latch release front end being inwardly deflectable so the latch release member front ends can be squeezed together to inwardly deflect the beam middles of said beams to move said latch dogs out of line with said bulkhead shoulders.

3. An optical fiber connector that includes an outer shell and a terminus receiver that lies in said outer shell and that has a plurality of terminus-receiving passages, a plurality of fiber optic cables each having a fiber and a protective covering, and a plurality of termini each lying in one of said terminus-receiving passages and being slideable in front and rear longitudinal directions, each terminus receiving a portion of one of said fiber optic cables, said fiber optic cables extending rearward from said terminus receiver and through a hollow rear portion of said outer shell and out through a hole in a rear end of said outer shell, comprising:

a strain relief assembly that lies in said outer shell hollow rear portion and that is longitudinally slideable therein, said strain relief assembly including a strain relief member securely held to each of said fiber optic cables but being of larger width than at least said hole in said shell rear end to prevent rearward movement of said strain relief member out of said outer shell.

4. The connector described in claim 3 including:

an elongated alignment member having a fixed front end and having a rear end slideably engaged with said strain relief member to prevent cocking of said strain relief member.

5. The connector described in claim 4 wherein:

said alignment member is in the form of a pin with a front end fixed to said terminus receiver.

6. The connector described in claim 3 wherein:

said strain relief member is molded with at least one longitudinally-extending groove that receives said fiber optical member, and including a wrap that wraps tightly around the strain relief member to hold the fiber optic member in the groove;

said strain relief member has an axis and has a radially-projecting flange having forwardly and rearwardly-facing shoulders;

said wrap is a heat-activated shrink wrap that is shrunk against and extends around said flange.

7. An optical fiber connector that can be inserted longitudinally forwardly into a bulkhead casing and that includes an outer shell and a terminus receiver forming a plurality of longitudinally-extending terminus-receiving passages, wherein:

said outer shell has a top and bottom, and has top and bottom manually-operable latches, each latch having a deflectable element, the elements of said top and bottom latches being deflectable downward and upward, respectively;

said terminus receiver has laterally opposite sides and has top and bottom latch-receiving longitudinally-extending grooves lying between said opposite sides;

said passages are arranged with a pair of top passages each lying on a different lateral side of said top groove and a pair of bottom passages each lying on a different lateral side of said bottom groove.

8. An optical fiber connector that is insertable in a forward longitudinal direction into a bulkhead casing that has at least one latch-receiving slot forming a largely forwardly-facing bulkhead shoulder and be latched thereto, and which can be unlatched from said bulkhead casing and pulled rearwardly therefrom, wherein the connector includes an outer shell and a terminus receiver that lies in said outer shell and that has at least one terminus-receiving passage and at least one optical fiber terminus lying in said passage, wherein:

said outer shell has an axis and a shell main part with a longitudinally-extending shell slot, and including a beam lying in said outer shell slot, said beam having a beam rear end, a beam front end, and a beam middle, one of said beam ends being fixed to said shell main part;

said terminus receiver has a groove that lies inward of said beam middle;

said beam middle has a latch dog with a largely rearwardly-facing latch dog shoulder for engaging said bulkhead shoulder, said beam middle being deflectable inwardly into said groove to move said latch dog shoulder inward so it lies out of line with said bulkhead shoulder, whereby to enable said connector to be pulled out of said bulkhead shell;

said beam rear end is fixed to said shell main part, and said terminus receiver has a front wall part that limits inward deflection of said beam front end toward said axis while allowing said beam front end to slide thereon, whereby to better support the beam.

9. The connector described in claim 8 including:

a latch release member having a rear end mounted on said outer shell at a location adjacent to the rear end of said beam, said latch release member having a member front portion lying directly outside said beam middle, said member front portion being inwardly deflectable against said beam middle to deflect said beam middle inwardly until said latch dog shoulder lies inward and out of line with said bulkhead shoulder;

said outer shell has a pair of rails lying on laterally opposite sides of said latch release member, whereby to protect said latch release member.

10. The connector described in claim 8 wherein:

said shell has a shell hole (132) with an axis and said latch release member rear end forms a peg (130) that is anchored in said shell hole so said latch release member can pivot about said shell hole axis;

said beam middle has an outer surface with an outwardly projecting bump having a tapered bump top, and said latch release member has a recess that receives at least said bump top, whereby said bump can orient said latch release member so its front end always lies directly outward of said beam middle.

11. A connector that includes an optic fiber terminus, a shell that surrounds the terminus, and a fiber optic cable extending in a longitudinal rearward direction from said terminus and out of a cable-passing hole at the rear end of said outer shell, wherein:

said outer shell has a hollow rear portion with a rear end that forms said cable-passing hole; and including a strain relief member that lies in said outer shell hollow rear portion and that is fixed against sliding relative to said cable;

a longitudinally-elongated alignment element that has a front end fixed with respect to said shell and a rear end slideably connected to said strain relief member to permit said strain relief member to slide in forward and rearward directions;

said cable-passing hole in said outer shell is narrower than said strain relief member to prevent said member from moving rearwardly out of said outer shell.

* * * * *